(12) United States Patent
Kamigawara et al.

(10) Patent No.: US 11,331,751 B2
(45) Date of Patent: May 17, 2022

(54) LASER CLADDING APPARATUS

(71) Applicant: NAKAMURA-TOME PRECISION INDUSTRY CO., LTD., Ishikawa (JP)

(72) Inventors: Atsushi Kamigawara, Kanazawa (JP); Naoto Masuko, Hakusan (JP)

(73) Assignee: NAKAMURA-TOME PRECISION INDUSTRY CO., LTD., Hakusan (JP)

( * ) Notice: Subject to any disclaimer, the term of this patent is extended or adjusted under 35 U.S.C. 154(b) by 308 days.

(21) Appl. No.: 16/266,700

(22) Filed: Feb. 4, 2019

(65) Prior Publication Data
US 2019/0240777 A1   Aug. 8, 2019

(30) Foreign Application Priority Data

Feb. 8, 2018   (JP) .............................. JP2018-020636

(51) Int. Cl.
*B23K 26/144*   (2014.01)
*B23K 26/14*    (2014.01)
*B23K 26/34*    (2014.01)
*B23K 26/12*    (2014.01)
*B33Y 30/00*    (2015.01)
*B22F 12/00*    (2021.01)
*B22F 10/10*    (2021.01)

(52) U.S. Cl.
CPC ............ *B23K 26/144* (2015.10); *B22F 12/00* (2021.01); *B23K 26/123* (2013.01); *B23K 26/14* (2013.01); *B23K 26/1437* (2015.10); *B23K 26/1476* (2013.01); *B23K 26/34* (2013.01); *B33Y 30/00* (2014.12); *B22F 10/10* (2021.01)

(58) Field of Classification Search
CPC ...................... B23K 26/1476; B23K 26/144; B23K 26/037; B23K 26/1462; B23K 26/147; B23K 26/34; B23K 35/0244; B23K 2103/50; B23K 26/32
USPC ............... 219/121.63, 121.6, 121.66, 121.84
See application file for complete search history.

(56) References Cited

U.S. PATENT DOCUMENTS 4,724,299 A * 2/1988 Hammeke ............ B23K 26/144
                                              219/121.84
4,774,392 A * 9/1988 Orita .................... B23K 26/144
                                              219/121.84

(Continued)

FOREIGN PATENT DOCUMENTS

DE      101 54 093 A1    5/2003
JP      H10-501463 A     2/1998

(Continued)

OTHER PUBLICATIONS

Sep. 19, 2019 Extended European Search Report issued in European Patent Application No. 19155399.9.

*Primary Examiner* — Ibrahime A Abraham
*Assistant Examiner* — Chris Q Liu
(74) *Attorney, Agent, or Firm* — Oliff PLC

(57) ABSTRACT

A processing head of a laser cladding apparatus, configured to form a cladding layer on a substrate, includes: a laser irradiation part that introduces incident laser light and irradiates the substrate with the laser light; a jet nozzle, into which an assist gas is introduced and which forms a jet of the assist gas around the laser light; and a powder storage part that stores a cladding material powder to be fed to the substrate. The powder storage part has a powder feeding port that is opened facing a jet formation region of the assist gas.

4 Claims, 3 Drawing Sheets

(56) References Cited

U.S. PATENT DOCUMENTS

| | | | | |
|---|---|---|---|---|
| 4,814,575 A | * | 3/1989 | Petitbon | B23K 26/32 |
| | | | | 219/121.84 |
| 5,477,026 A | * | 12/1995 | Buongiorno | B23K 26/144 |
| | | | | 219/121.84 |
| 5,837,960 A | * | 11/1998 | Lewis | B23K 26/144 |
| | | | | 219/121.64 |
| 2006/0266740 A1 | * | 11/2006 | Sato | B23K 26/144 |
| | | | | 219/121.84 |
| 2011/0089151 A1 | | 4/2011 | Miyagi et al. | |
| 2012/0199564 A1 | | 8/2012 | Washko, Jr. et al. | |
| 2014/0186549 A1 | * | 7/2014 | Miyagi | B23K 26/342 |
| | | | | 427/554 |
| 2014/0287165 A1 | * | 9/2014 | Cavanaugh | C23C 26/02 |
| | | | | 106/1.19 |
| 2016/0101484 A1 | * | 4/2016 | Iwatani | B23K 26/342 |
| | | | | 219/76.1 |
| 2017/0136578 A1 | * | 5/2017 | Yoshimura | B33Y 30/00 |
| 2017/0198394 A1 | * | 7/2017 | Coward | B23K 26/144 |
| 2017/0225228 A1 | * | 8/2017 | Nagahama | B33Y 70/00 |
| 2017/0259378 A1 | * | 9/2017 | Ohno | B23K 26/144 |
| 2017/0282294 A1 | * | 10/2017 | Uchida | B23K 26/0626 |

FOREIGN PATENT DOCUMENTS

| | | |
|---|---|---|
| JP | 2003-340583 A | 12/2003 |
| JP | 2005-219060 A | 8/2005 |
| JP | 2010-207877 A | 9/2010 |
| WO | 95/20458 A1 | 8/1995 |

\* cited by examiner

LASER CLADDING APPARATUS

The contents of Japanese Patent Application No. 2018-020636 filed on Feb. 8, 2018 are incorporated in this application.

BACKGROUND

The present disclosure relates to a laser cladding apparatus for performing precise cladding by welding by way of laser light.

The laser cladding apparatus that performs cladding by heating and melting a cladding material powder with a laser beam, receives small heat input as compared to conventional arc welding and plasma welding, and can thus perform precise cladding.

As a laser processing head for laser cladding, what has been proposed so far is one in which a powder feeder for feeding a cladding material powder to a laser-beam irradiation part is provided separately from a processing head, as shown in JP-A-2003-340583, JP-A-2005-219060, JP-T-10-501463, and the like.

FIG. 5 illustrates a common structure of the above laser processing head.

While an assist gas G is jetted around laser light 12 collected with an optical lens 11 or the like, a cladding material powder P is fed toward the laser light 12, to form a heat-melting part M on the surface of a substrate.

A powder feeder provided separately from a processing head and a powder feeding passage 2 provided in the processing head are connected to each other with a flexible tube. This cladding material powder P is fed from the powder feeder through the flexible tube and the powder feeding passage 2 during cladding process.

In this structure, the feeding passage for the cladding material powder is complex, and this makes the apparatus expensive.

DESCRIPTION OF EXEMPLARY EMBODIMENTS

Figure 1:
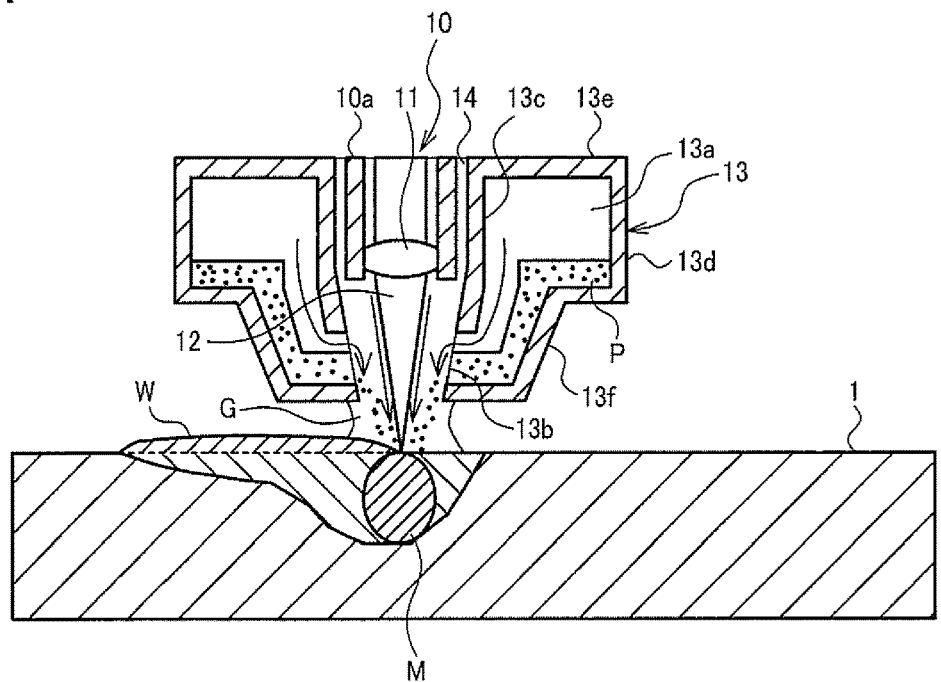
FIG. 1 illustrates a structural example of a processing head of a laser cladding apparatus according to one embodiment of this disclosure.

The following disclosure provides many different embodiments, or examples, for implementing different features of the provided subject matter. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a laser cladding apparatus comprising:

a processing head that forms a cladding layer on a substrate, wherein the processing head includes a laser irradiation part that introduces incident laser light and irradiates the substrate with the laser light, a jet nozzle, into which an assist gas is introduced and which forms a jet of the assist gas around the laser light, and a powder storage part that stores a cladding material powder to be fed to the substrate, and the powder storage part includes a powder feeding port that is opened facing a jet region of the assist gas.

In the laser cladding apparatus according to one aspect of the disclosure, the cladding material powder stored in the powder storage part is fed along the flow of the assist gas (shielding gas). That is, the pressure in a region where a jet of the assist gas is formed becomes negative, so that the cladding material powder stored in the powder storage part is sucked by the jet of the assist gas through the powder feeding port of the powder storage part. Thereby, the cladding material powder is fed to the substrate that is irradiated with laser light, together with the assist gas, to form a cladding layer on the substrate. This eliminates the need to feed the cladding material powder to the powder storage part provided in the processing head during cladding process and, furthermore, enables feeding of the cladding material powder by use of the jet of the assist gas, thus simplifying the structure of the laser cladding apparatus.

In accordance with one of some embodiments, the powder storage part can be a container that is sealed except for the powder feeding port. This is because the cladding material powder does not need to be fed to the powder storage part during the cladding process.

When the sealed container is used as the powder storage part, due to the flow of the assist gas, the air inside container is discharged along with the cladding material powder stored in the container, resulting in a decrease in pressure inside the container. This may lead to a decrease in feed rate of the cladding material powder.

Then, a jet quantity (jet velocity) of the assist gas (shielding gas) is variably adjusted, so that the feed rate of the cladding material powder can be adjusted.

Therefore, in accordance with one of some embodiments, a gas feeding part for feeding the assist gas to the jet nozzle is provided, and the gas feeding part enables the jet velocity of the assist gas in the gas flow nozzle to be varied.

In accordance with one of some embodiments, the powder storage part may be removably supported by the processing head. When the cladding material powder in the powder storage part gets less, the powder storage part can be removed from the processing head, and the powder storage part replenished with the cladding material powder can be placed on the processing head.

In accordance with one of some embodiments, the apparatus may further include: a powder replenishment part that replenishes the powder storage part with the cladding material powder when cladding process is not performed; and a tube that links the powder storage part and the powder replenishment part. Thereby, after the cladding process, it is possible to replenish the powder storage part, in which the cladding material powder has become less, with the cladding material powder from the powder replenishment part through a tube. When the processing head moves, a flexible tube can be used as the tube.

Figure 2:
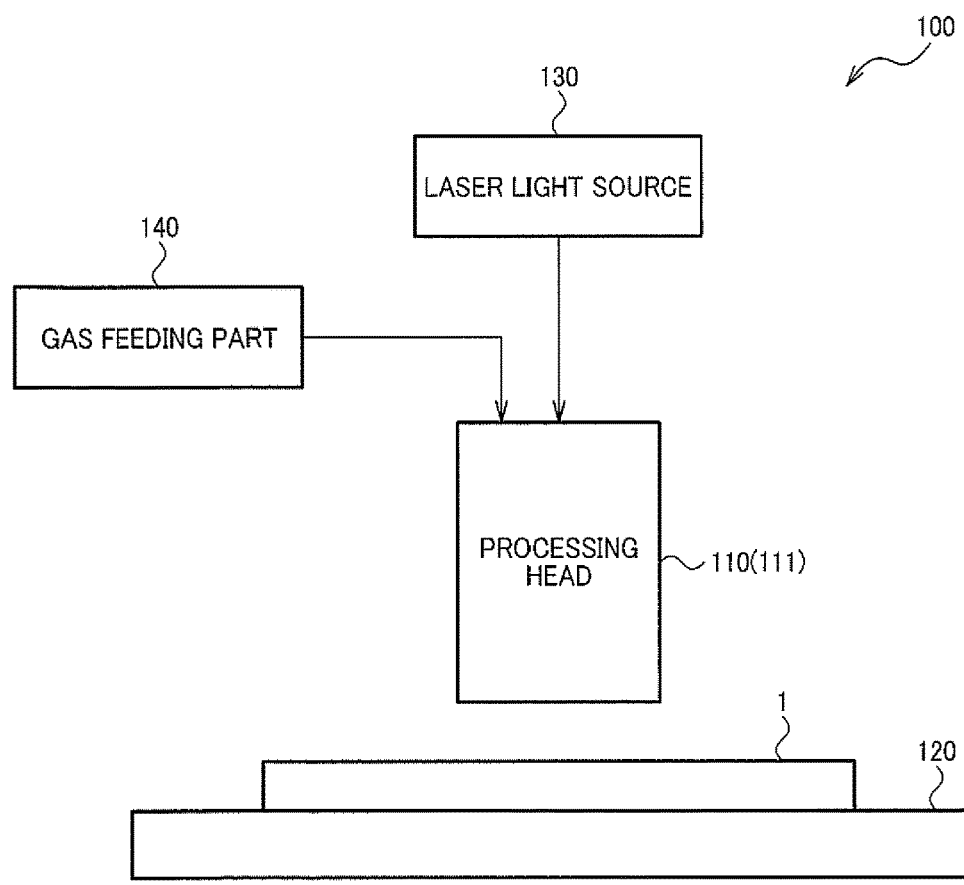
FIG. 2 illustrates a block diagram of a laser cladding apparatus according to one embodiment of the disclosure.

A laser cladding apparatus according to an embodiment of the disclosure will be described with reference to FIGS. 1 and 2. FIG. 1 schematically illustrates a structural example of a processing head 110 provided in a laser cladding apparatus 100. FIG. 2 is an overall diagram of the laser cladding apparatus 100 including the processing head 110.

In FIG. 2, the laser cladding apparatus 100 includes the processing head 110, a moving table 120 that supports and moves a substrate 1 forward, a laser light source 130 that emits laser light to be guided to the processing head 110, and a gas feeding part 140 that feeds an assist gas to the processing head 110. Note that the substrate 1 and the processing head 110 may be moved forward relatively, and a feeding mechanism of the processing head 110 may be provided instead of a moving table 120.

In FIG. 1, the processing head 110 includes a laser irradiation part 10, a jet nozzle 14 for an assist gas G, and a powder storage part 13.

The laser irradiation part 10 guides laser light incident thereon from the laser light source 130, e.g., collects the light with the lens 11 or the like, and irradiates the surface of the substrate 1 with the laser light 12.

The jet nozzle 14 for the assist gas G is provided around the laser irradiation part 10. The jet nozzle 14 forms a jet of the assist gas G such as an inert gas toward the surface of the substrate 1. The laser irradiation part 10 is disposed at the longitudinal center of the jet nozzle 14.

What is characteristic in the embodiment of the disclosure is that in the processing head 110, the powder storage part 13 having a container shape is mounted in the vicinity of the laser irradiation part 10, for example.

Hence a feeding tube for the cladding material powder P is unnecessary.

The powder storage part 13 is a sealed container having a powder feeding port 13b and being sealed except for the powder feeding port 13b.

In the present embodiment, the powder storage part 13 is a container including an inner wall 13c, an outer wall 13d, a top wall 13e, and a bottom wall 13f, and being sealed except for the powder feeding port 13b formed in the inner wall 13c.

Further, in the present embodiment, the laser irradiation part 10 includes a cylindrical body 10a that forms a laser light path, and for example, a lens 11 is held in the cylindrical body 10a. In the present embodiment, the jet nozzle 14 can be formed of the inner wall 13c of the powder storage part 13 and the cylindrical body 10a of the laser irradiation part 10.

The powder feeding port 13b of the powder storage part 13 is opened at a position facing a region where the jet of the assist gas G is formed by the jet nozzle 14. The pressure becomes negative in the jet formation region where the jet of the assist gas G is formed by the jet nozzle 14. Therefore, along the flow of the assist gas G, the cladding material powder P is sucked to the jet formation region through the powder feeding port 13b together with air 13a inside the powder storage part 13, and fed to a light collection part of the laser light 12 on the surface of the substrate 1.

The jetted cladding material powder P is heated by the laser light 12 to form a melt pool M melt on the surface of the substrate 1, and the melt pool M is then cooled to form a laser cladding layer W.

The air 13a inside the powder storage part 13 is sucked out together with the cladding material powder P, and the pressure inside the powder storage part 13 decreases. This may lead to a decrease in feed rate of the cladding material powder P. Then, the gas feeding part 140 variably adjusts a flow rate of the assist gas (shielding gas) G per unit time.

By adjusting the flow rate of the assist gas G, the feed rate of the cladding material powder P can be adjusted. Further, when the flow of the assist gas G is stopped, the air flows from the powder feeding port 13b into the powder storage part 13, and the pressure inside the powder storage part 13 recovers.

Figure 3:
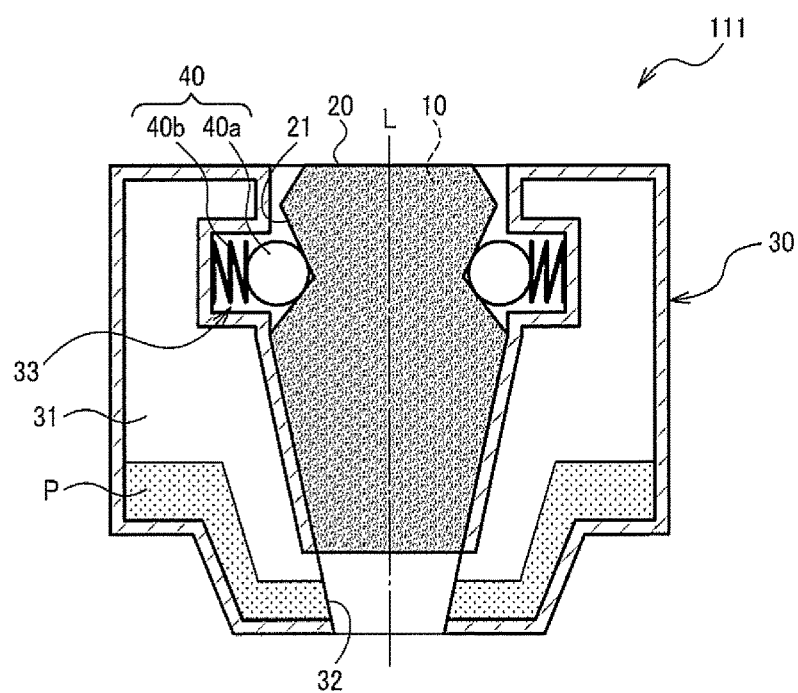
FIG. 3 is a view illustrating a processing head where a powder storage part is removable from a jet nozzle.

The powder storage part 13 in the container shape may be a cartridge type replaceable with respect to the processing head 110. FIG. 3 illustrates an example of the processing head 111 provided with the powder storage part 13 replaceable with respect to a jet nozzle 20. The jet nozzle 20 includes on its inside the laser irradiation part 10 illustrated in FIG. 1 along a center line L of its vertical axis. The jet nozzle 20 has a recess 21 on its outer wall. Meanwhile, as in FIG. 1, the powder storage part 30 is a container that divides a storage space 31 where the cladding material powder P is stored, and has a powder feeding port 32 that is opened facing the jet formation region of the assist gas (shielding gas) G, formed by the jet nozzle 20.

In the powder storage part 30, for example, a three-point-suspension ball plunger 40 is disposed at a position 33 facing the recess 21 of the jet nozzle 20. The ball plunger 40 holds a ball 40a to prevent falling of the ball 40a by using a spring 40b that presses and urges the ball 40a toward the radially center side. By pushing and moving the powder storage part 30 downward along the center line L of the vertical axis with respect to the jet nozzle 20, the ball 40a comes off the recess 21, and the powder storage part 30 can be taken out of the jet nozzle 20. By the opposite operation thereto, the powder storage part 30 can be placed on the jet nozzle 20. When the cladding material powder P in the powder storage part 30 gets less, the powder storage part 30 can be removed from the jet nozzle 20 of the processing head 111, and the powder storage part 30 replenished with the cladding material powder P can be placed on the processing head 111.

Figure 4:
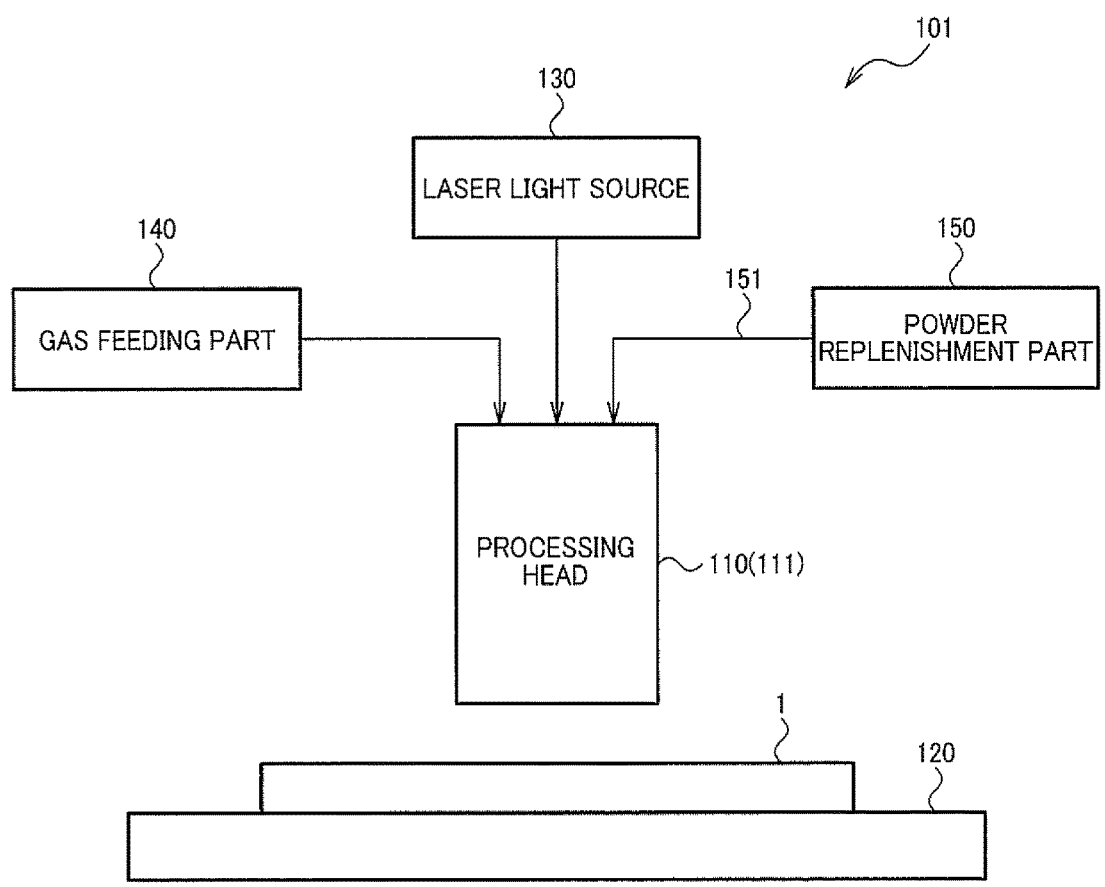
FIG. 4 illustrates a block diagram of a laser cladding apparatus according to another embodiment of the disclosure.
Figure 5:
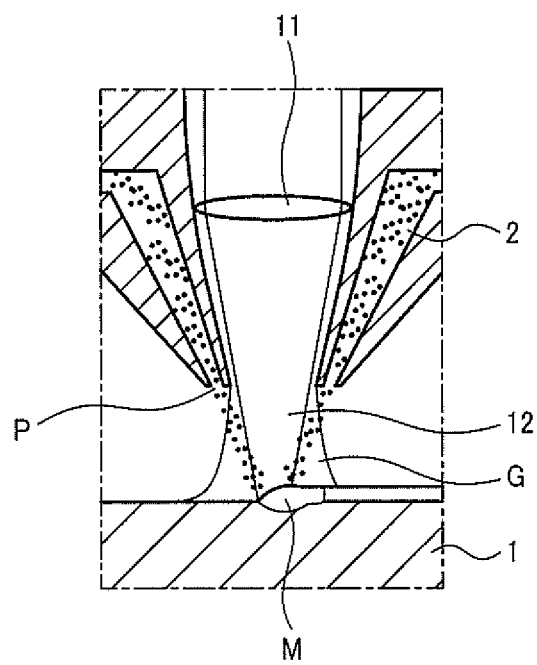
FIG. 5 is a structural example of a conventional processing head.

Alternatively, the powder storage part 13, 30 may be manually or automatically replenished with the cladding material powder P. FIG. 4 illustrates a laser cladding apparatus 101 including a powder replenishment part 150 linked to the processing head 110, 111 through a tube 151. Thereby, after the cladding process, it is possible to manually or automatically replenish the powder storage part 13, 30, in which the cladding material powder P has become less, with the cladding material powder P from the powder replenishment part 150 through the tube 151. For example, when a residual detection sensor for the cladding material powder P is provided in the powder storage part 13, 30, the replenishment with the cladding material powder P can be performed automatically. When the processing head 110, 111 moves, a flexible tube can be used as the tube 151.

In addition, an adjustment unit for air pressure inside the powder storage part 13, 30 may be provided. For example, the powder storage part 13, 30 may have an opening other than the powder feeding port 13b, 32, and with the opening, the pressure inside the powder storage part 13, 30 may be constantly held at the atmospheric pressure. This eliminates the need for the gas feeding part 140 to variably adjust the flow rate of the assist gas G.

As described above, by directly mounting the powder storage part 13, 30 for the cladding material powder P on the processing head 110, 111, the compact laser cladding apparatus 100, 101 with a simple structure is obtained.

What is claimed is:

1. A laser cladding apparatus comprising:
a processing head that forms a cladding layer on a substrate, wherein
the processing head includes
a cylindrical body with a lens configured to collect laser light and irradiate the substrate with the laser light,
a jet nozzle into which an assist gas is introduced to form a jet of the assist gas around the laser light, and
a powder container around the jet nozzle and configured to store a cladding material powder to be fed to the substrate,
the powder container includes a powder feeding port with an opening facing a jet region of the assist gas,
the powder container includes an inner wall around the jet nozzle, an outer wall, a top wall, and a bottom wall and the powder feeding port is through the inner wall and is the only unsealed opening,
the laser cladding apparatus is configured to feed the assist gas to the jet nozzle and adjust a feed rate of the cladding material powder by adjusting a flow rate of the assist gas that controls a pressure inside the powder container, and
the laser cladding apparatus does not include a powder feeding device that feeds the cladding material powder to the powder container.

2. The laser cladding apparatus according to claim 1, wherein the powder container is removably supported by the processing head.

3. The laser cladding apparatus according to claim 1, wherein the powder container is configured such that negative pressure caused by the assist gas in the jet region decreases pressure in the powder container.

4. The laser cladding apparatus according to claim 1, wherein the powder container does not extend beyond the processing head.

\* \* \* \* \*